United States Patent [19]

Whitman, III

[11] Patent Number: 4,763,419
[45] Date of Patent: Aug. 16, 1988

[54] OPTICAL VIEWING SYSTEM

[76] Inventor: Hobart A. Whitman, III, 149 Westwood Rd., Asheville, N.C. 28804

[21] Appl. No.: 919,661

[22] Filed: Oct. 16, 1986

[51] Int. Cl.$^4$ ............................................... G01C 23/00
[52] U.S. Cl. ........................................ 33/272; 33/364; 33/348; 33/334
[58] Field of Search ................ 33/364, 272, 273, 275, 33/292, 355 R, 334, 348, 277, 1 L, 1 T, 1 DD; 356/247, 139, 253, 142, 254, 143

[56] References Cited

U.S. PATENT DOCUMENTS

| | | | |
|---|---|---|---|
| 811,777 | 2/1906 | Konig | 356/142 X |
| 1,705,146 | 3/1929 | Willson | 33/348 X |
| 2,022,516 | 11/1935 | Owen | 356/142 |
| 3,423,051 | 1/1969 | Jakab | 33/275 G X |
| 3,527,523 | 9/1970 | Travis | 350/174 X |
| 4,402,140 | 9/1983 | Nagae | 33/272 |

FOREIGN PATENT DOCUMENTS

| | | | |
|---|---|---|---|
| 910595 | 5/1954 | Fed. Rep. of Germany | 33/272 |
| 725862 | 3/1955 | United Kingdom | 33/348 |

Primary Examiner—Harry N. Haroian
Attorney, Agent, or Firm—David M. Carter

[57] ABSTRACT

There is provided an optical viewing system, which is preferably a compass which eliminates the parallax and sighting problems of prior art optical systems. The compass includes a beam splitter which displays a sighted image both on a reference screen and a free-floating magnetized sphere or other moving surface. The sighted image on the reference screen and on the sphere are superimposed upon each other when viewed through one facet of the beam splitter. In this manner parallax is eliminated, thus the direction and elevation of the image may be readily and accurately determined.

8 Claims, 3 Drawing Sheets

OPTICAL VIEWING SYSTEM

BACKGROUND OF THE INVENTION

This invention relates to optical viewing devices. More particularly, it relates to sighting and position determining devices such as optical compasses.

In the use of scientific instruments having meters, quite often inaccuracies in reading the meters caused by parallax are greater than the internal inaccuracies of the device itself. Parallax occurs in reading instruments such as compasses because the needle does not lie directly against its scale. This parallax phenomenon can be readily observed in reading the speedometer of an automobile whereby the driver of the automobile observes one speed while the passenger perceives another less accurate reading. Unless the observer's eye is aligned correctly with the needle and the scale, parallax will cause inaccuracies in reading the instrument.

Another problem primarily associated with compasses is that the compass magnetic needle is normally operative only in the horizontal plane; therefore, the needle is not directly accessible for sighting an object. Some improvements in sighting accuracy have been made, such as by utilizing a fold-out mirror which is integral with the compass housing which allows a person to sight an object adjacent to the mirror image of the compass reading. However, that type compass does not solve the problem of parallax.

In the field of navigation, compass reading inaccuracies caused by phenomenon such as parallax can be devasting. For example, a one-degree error results in a 88-foot inaccuracy for every mile. Thus in a 100-mile voyage the inaccuracy is approximately 1½ miles. This type of inaccuracy is graphically demonstrated when a prior art compass is used in sighting distant objects such as mountain peaks for determining the position of the user by triangulation. Furthermore, the larger the distance between a compass needle and the compass face, the greater the parallax problem.

U.S. Pat. No. 4,402,140 issued to Nagae shows a telescope which utilizes an immersion type spherical compass so that a compass reading may be made even if the device is not in the horizontal position. However, the Nagae patent does not overcome the parallax problem.

U.S. Pat. No. 3,084,443 issued to Kaatz teaches a compass which also utilizes a floating sphere and which also includes latitude lines so that the device may also be used as a inclinometer. However, there is no provision for dealing with the parallax problem.

British Pat. Nos. 1,293,808 and 1,510,467 and U.S. Pat. Nos. 1,043,562, 2,022,516 and 2,970,510 also show compasses which utilize optical systems. However, again, none of these patents solve the parallax problem.

U.S. Pat. Nos. 1,376,727, 3,128,562 and 1,294,710 show compasses which utilize floating spheres so that readings may be made even though the compass is not oriented horizontally.

In the field unrelated to compasses, U.S. Pat. No. 2,911,879 teaches the use of a beam splitter to superimpose the image of a grid on to the image of an object being viewed. However, parallax is still a problem in this patent.

OBJECTS OF THE INVENTION

It is therefore one object of this invention to provide an improved optical viewing system which is both simple and accurate.

It is another object to provide an improved optical viewing system which overcomes the inaccuracies associated with parallax.

It is another object to provide an optical compass which overcomes the sighting and reading problems associated with parallax.

It is another object to provide a compass which also acts as an inclinometer.

It is still another object to provide an improved compass which may be read simultaneously while an object is being sighted.

SUMMARY OF THE INVENTION

In accordance with one form of this invention there is provided an improved optical viewing system which is preferably a compass. The system may include a first lens for receiving incident light from an object, the position of which is to be determined. A beam splitter is provided for receiving light from said first lens. A first screen receiver light from one facet of said beam splitter wherein an image of the object is projected thereof. A second screen receives light from another facet of said beam splitter wherein an image of the object is projected thereon. Where the optical view system is in the form of a compass the first screen may be substantially spherically-shaped and containing a magnetic portion. The first screen in its spherical construction is adapted to rotate resulting in the magnetic portion facing Magnetic North. An eyepiece receives light from still another facet of the beam splitter whereby an observer may observe simultaneously the first and said second screen with images of the object on each screen being superimposed upon one another. The above apparatus eliminates parallax in that the observer may move his eye about the eyepiece in any position without observing any change in indicated compass reading.

BRIEF DESCRIPTION OF THE DRAWINGS

The subject matter which is regarded as the invention is set forth in the appended claims. The invention itself, however, together with further objects and advantages thereof may be better understood with reference to the following description taken in conjunction with the accompanying drawings in which:

DESCRIPTION OF THE PREFERRED EMBODIMENTS

Figure 1:
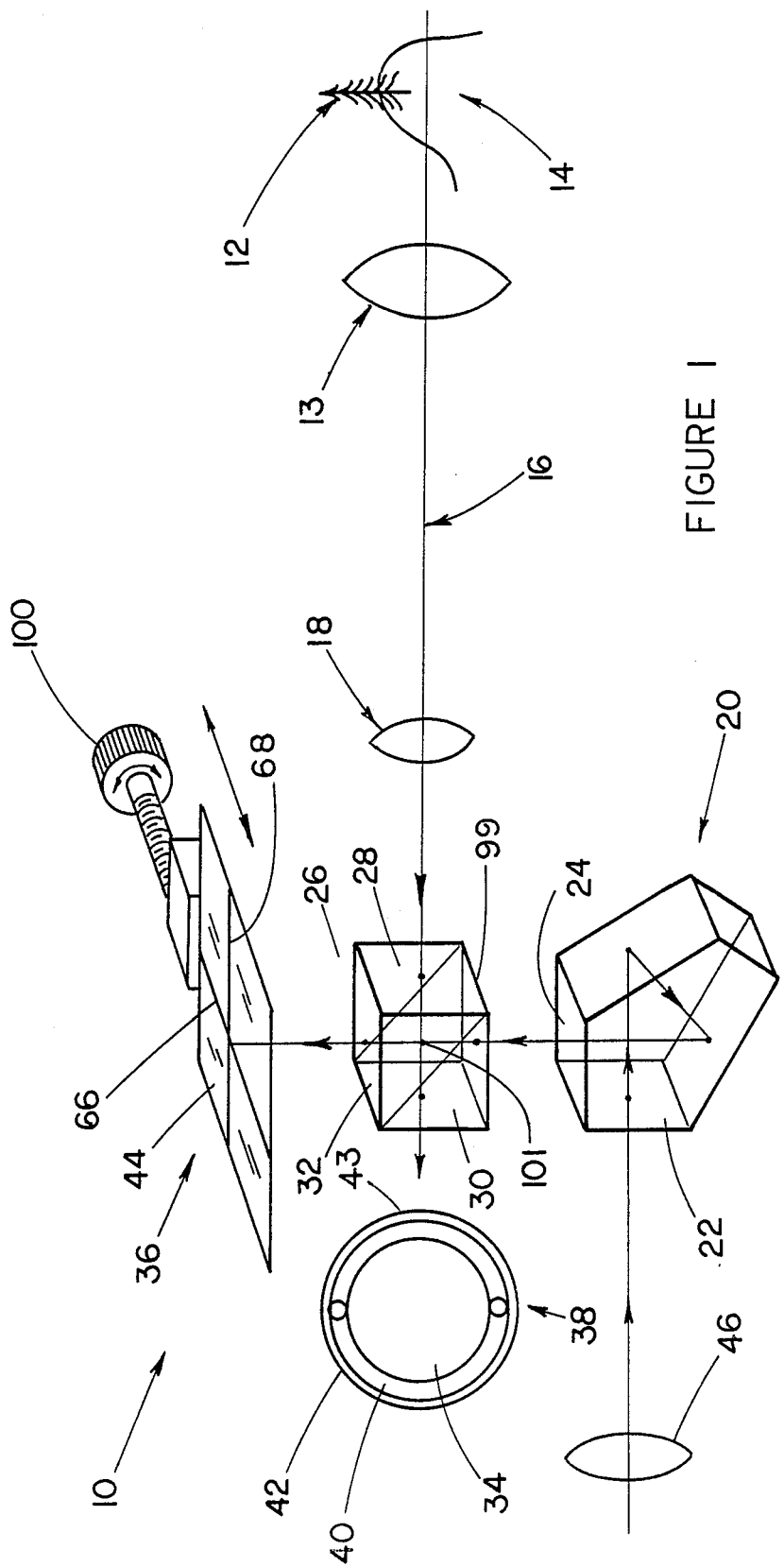
FIG. 1 is a schematic of one form of the improved optical viewing system incorporating the subject invention wherein the system illustrated is a compass.
Figure 3:
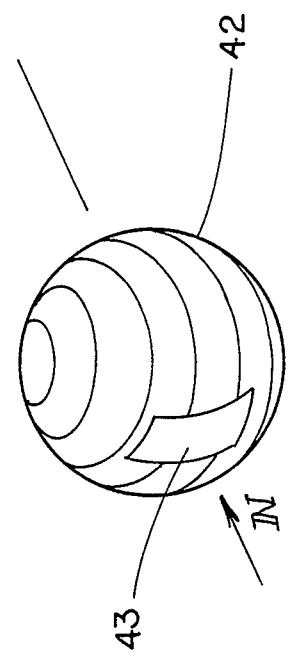
FIG. 3 is a perspective view of the transparent sphere which houses the floating sphere of FIG. 2.

Referring now more particularly to FIG. 1, there is provided an improved optical viewing system which, in the illustrative embodiment, is optical compass 10 used to observe the position and elevation of objects such as, for example, object 12 which in this instance is a tree located on top of hill 14. Optical compass 10 includes objective lens 13 which receives reflected light from object 12. The light travels along optical path 16 through inverting lens 18 to beam splitter 26. The light from the inverting lens is received at facet 28 of the beam splitter. Beam splitter 26 is a commercially available device known to those skilled in the art. The beam of light is split to reflection/refraction point 101 and passes out of the splitter through facets 30 and 32 with identical images being imposed onto screens 34 and 36, respectively. In this embodiment screen 34 is a sphere free floating in liquid 40 which preferably is kerosene or other clear petroleum product. Sphere 34 is housed in sphere 42 having a clear plastic or glass viewing window 43 as shown in FIG. 3. The image is also projected onto screen 36, which includes a plurality or horizontal and vertical reference indicia 44 for slope and direction determination. Screens 34 and 36 could be replaced with mirrored surfaces.

Pentaprism 20 receives the light from object 12 and screen 34 and 36 at facet 24 from facet 99 of the beam splitter. The penta prism is used to change the direction of the light by 90° to maintain a non-inverted, non-reverted image. Thus the observer may sight with the compass horizontally like binoculars. Eyepiece 46 receives the light from facet 22 of the pentaprism. The superimposed images are viewed by the observer through eyepiece 46. The observer is able to simultaneously observe the two images of object 12, which are superimposed on each other and thus appear as a single image, the scale on the spherical floating screen, as well as the indicia on the reference screen for determining the position of the object from the standpoint of a compass as well as its inclination relative to the horizontal without the accompanying problem of parallax. Thus the device operates both as a compass and as an inclinometer.

Figure 2:
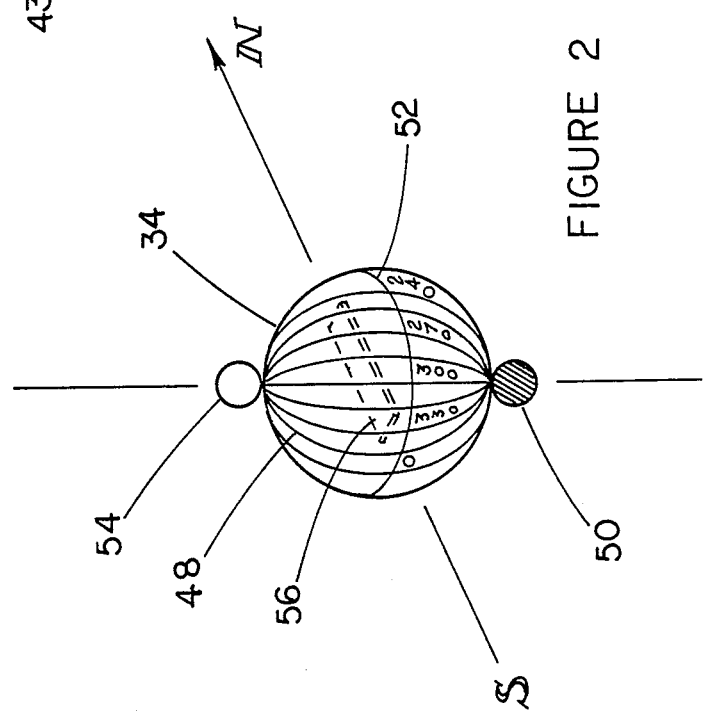
FIG. 2 is a perspective view of the floating sphere utilized in the system of FIG. 1.

The spherical screen 34 and its container 42 may be better seen in reference to FIGS. 2 and 3. As shown in FIG. 2, the surface of sphere 34 includes a plurality of longitudinal lines 48 which are marked by compass degree numbers, which in this embodiment are 30 degrees apart. Dead weight 50 is connected to the bottom of sphere 4 so that under the influence of gravity the sphere equator 52 is always oriented horizontally. Thus equator 52 serves as a horizontal indicator. A hollow floatation sphere 54 is also provided to insure that the sphere stays buoyant. A magnet 56 is embedded within the inside of the sphere across the equator thereof on the zero degree line to the 180 degree line for aligning the sphere in the magnetic north/south direction. The sphere normally would be painted white to properly illuminate the image of object 12 which will be projected thereon.

Referring now to FIG. 3, outer sphere 42 houses sphere 34 as well as a liquid for floating sphere 34. Sphere 42 is somewhat transparent however window 43 is clear so that the compass scale and the image of object 12 may be viewed. Window 43 receives the light beam from facet 30 of beam splitter 26 as shown in FIG. 1. Compensation is made to indicate True North as opposed to Magnetic North is made by adjusting thumb screw 100 which is attached to screen 36 as shown in FIG. 1. The adjustment of screw 100 moves screen 36 in the direction of horizontal indicia 66 to provide movement of vertical indicia 68 for easterly or westerly declination.

Figure 4:
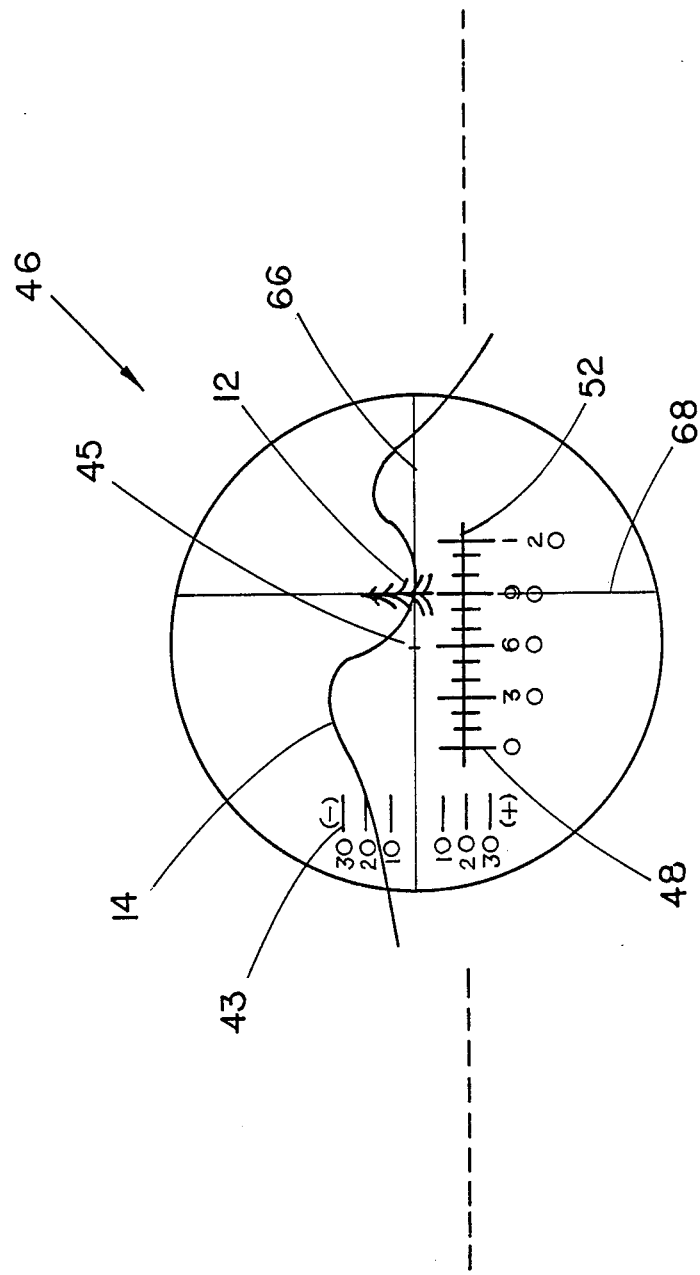
FIG. 4 is a view through the eyepiece of FIG. 1.

Referring now more particularly FIG. 4, there is provided eyepiece 46 showing the images from object 12, hill 14 screen 36 and spherical screen 34 as seen by the observer. Object 12 images appear as one image as a result of superimposition of the images from the reference screen 36 and spherical screen 34. Furthermore, as seen through lens 46, the indicia 48 is shown having degree markings from spherical screen 34 as well as the slope or elevation marks 43 in degrees from reference screen 36 and cross hairs 66 and 68. Thus the object is sighted, its compass direction is determined, and its elevation from the horizon is determined all simultaneously by centering the object on the cross hairs.

Screen 36 was moved by screw 100 to compensate for 10 degrees of magnetic declination from True North as shown by the distance of line 68 from centerpoint 45 of lens 46. As can be seen, the tree 12 lies 90 degrees from True North as indicated by the intersection of line 68 with the tree and scale 48. Line 52, which is the equator from sphere 34 corresponds to an artificial horizon while vertical line 68 is used to align the image of the object with the degree reading from the spherical screen 34. Line 66 is arranged so as to provide an accurate reference above or below the horizon which references to artificial horizon 52. Thus a indication of the degree of elevation of the object being viewed can be made by noting the distance between line 52 and line 66 which in the illustration is 20 degrees.

The superimposition of the images no matter where one observes the objects through the eyepiece will not produce parallax. Therefore, the position on elevational readings will be highly accurate and will not be affected by parallax. The apparatus referred to in FIGS. 1 and 4 may be housed in a standard monocular or binocular housing such as that shown in U.S. Pat. No. 4,402,140. In any event, the housing would be obvious to one skilled in the art. In constructing the device it is important that the distance between the reflective/refraction point 101 of the beam splitter to the reference screen 36 and to the spherical screen 34 are equal in order to insure the elimination of parallax and proper superimposition of the object images and indicia on the screens. As shown in FIG. 1, the light beams strike the facets and the screen at 90° degrees.

From the foregoing description of the preferred embodiment of the invention, it would be apparent that many modifications may be made therein. As an example, one or both screens could be mirrored to enhance image intensity. External lighting from a battery powered light source to illuminate either or both screens may also be used. Furthermore, the spherical screen could be replaced with another moving surface indicating direction. It will be understood, therefore, that this embodiment is intended as an exemplification of the invention and the invention is not limited thereto. It should be understood that it is intended in the appended claims to cover all such modifications in the true spirit and scope of the invention.

I claim:

1. An optical viewing system comprising:
   a beam splitter having at least first, second, and third facets; said first facet receiving light from an object;
   a first screen receiving light from said second facet where an image of said object is projected thereon;
   a second screen receiving light from said third facet where an image of said object is projected thereon;
   at least one of said screens having indicia thereon to reference the position of the object;
   means for viewing the images of said object on said screens; said object images being superimposed on one another whereby the position of said object may be determined without parallax; said beam splitter having a reflective/refractive point; the distance between said reflective/refractive point and each of said screens being substantially equal; said system is a compass; said first screen forming a part of said compass and having a portion thereof magnetized; said first screen adapted to rotate with the magnetic portion facing substantially North.

2. A system as set forth in claim 1 further including indicia on said second screen for inclination measurement.

3. A system as set forth in claim wherein said first screen is a first sphere; said system further including a second sphere; said first sphere received in said second sphere; portions of said second sphere being substantially clear; said first sphere including a plurality of longitudinal lines.

4. A system as set forth in claim 3 wherein said second sphere receives a liquid whereby said first sphere will float.

5. A system as set forth in claim 4 wherein said first sphere has a weighted bottom and an equator lying therearound for indicating an artificial horizon.

6. A system as set forth in claim 3 wherein said second screen includes a pair of cross hairs with a first cross hair being parallel with the equator of said first sphere and the second cross hair aligning with the object and with one of said longitudinal lines for directional determination.

7. A system as set forth in claim 6 further including means for moving said second screen and thus said second cross hair for adjusting for magnetic declination.

8. A system as set forth in claim 1 further including a pentaprism between one facet of said beam splitter and said means for viewing.

* * * * *